United States Patent [19]
Vikiö

[11] Patent Number: 5,996,806
[45] Date of Patent: Dec. 7, 1999

[54] METHOD AND APPARATUS FOR TREATING FILLER-CONTAINING MATERIAL SUCH AS RECYCLED FIBERS

[75] Inventor: Pentti Vikiö, Karhula, Finland

[73] Assignee: Ahlstrom Machinery Oy, Helsinki, Finland

[21] Appl. No.: 08/894,959

[22] PCT Filed: Dec. 27, 1995

[86] PCT No.: PCT/FI95/00711

§ 371 Date: Sep. 3, 1997

§ 102(e) Date: Sep. 3, 1997

[87] PCT Pub. No.: WO95/04189

PCT Pub. Date: Feb. 9, 1995

[30] Foreign Application Priority Data

Mar. 7, 1995 [FI] Finland ..................... 951036

[51] Int. Cl.[6] .......................................... B03B 7/00
[52] U.S. Cl. ..................... 209/10; 209/12.1; 209/17; 209/725
[58] Field of Search .............. 209/10, 12.1, 17, 209/724, 725

[56] References Cited

U.S. PATENT DOCUMENTS

| 4,167,438 | 9/1979 | Holz ........................... 209/17 X |
| 4,332,638 | 6/1982 | Mauer et al. ................ 209/10 X |
| 5,112,444 | 5/1992 | Henricson et al. .......... 209/17 X |

FOREIGN PATENT DOCUMENTS

| 1346248 | 10/1987 | U.S.S.R. ..................... 209/17 |
| 2061133 | 5/1981 | United Kingdom ........ 209/17 |

*Primary Examiner*—Tuan N. Nguyen
*Attorney, Agent, or Firm*—Nixon & Vanderhye P.C.

[57] ABSTRACT

A method and apparatus for treatment of recycled fiber material and/or of the reject fraction discharged from paper mill screening systems of the short circulation of a paper machine, recover fillers as completely as possible and return the fillers back to the process as efficiently and economically as possible. The loss of fiber/mineral discharge as mill rejects from vortex cleaning and filler manufacture is decreased by treating a concentrated mineral fraction of the rejects to disperse the filler-mineral fraction and return the filler back to the paper making process.

20 Claims, 8 Drawing Sheets

METHOD AND APPARATUS FOR TREATING FILLER-CONTAINING MATERIAL SUCH AS RECYCLED FIBERS

CROSS REFERENCE TO RELATED APPLICATION

This application is a U.S. national phase of PCT/FI95/0711.

BACKGROUND AND SUMMARY OF THE INVENTION

The present invention relates to a method and apparatus in the treatment of the fiber fraction exiting from treatment of recycled fibers, and/or from vortex cleaning of a paper mill as mill reject, and/or in general a fraction exiting as a mineral-containing reject. As known, sources of recycled fibers include, for example, so-called broke of a paper machine, which may be recycled as raw material, and the actual post-consumer waste paper and board. The present invention especially relates to the treatment of recycled fiber materials of this kind in such a way that the fillers contained in the materials may be recovered as completely as possible and returned to the process as efficiently and economically as possible.

In the short circulation of paper machines manufacturing filler-containing paper grades and especially coated paper grades, a substantial amount of mineral and pigment fraction is discharged nowadays from the process as mill reject of a vortex cleaning plant which as a material could be utilized as raw material for paper but the particle size of this material is too coarse. Another source of mineral-containing rejects in a paper mill are filler and coating pigment manufacturing processes and the flushing waters from the apparatus used in these processes.

In the short circulation of paper machines manufacturing SC grades and other filler-containing grades, the mineral fraction exiting the vortex cleaning as mill reject is the coarse portion of the mineral fraction, i.e. the filler, supplied in the pulp dosing and usually having a particle size of over 10 $\mu$m.

In the short circulation of paper machines manufacturing coated paper grades, the mineral fraction exiting the process as mill reject mainly contains non-dispersible coating layer of coated broke. The coating layer has not dispersed in the broke dispersion system to particles fine enough. This fraction of the coating layer, usually having a particle size of over 10 $\mu$m, is rejected in the vortex cleaning of the short circulation.

The same applies also to systems for recycled pulp, in which coated magazine paper or like heavily coated raw material for recycled paper is used as the raw material. In the defiberizing system for recycled pulp the coating layer of the coated paper is detached from the fiber layer of the paper itself more of less in sheet-like fractions, which become partially crumbled in the process. The crumbling and dispersion are, however, not complete and thus, these non-dispersed coating pigment particles are discharged from the process as reject of the vortex cleaning in the screening stage of the recycled pulp line. However, in view of their raw material composition, a major part of these particles would be usable in the paper manufacture as filler which may have to be added to the pulp suspension at a later stage in the paper manufacture. The size of these particles, however, will cause problems in the paper machine itself if the particles are not dispersed and thus made usable as filler.

In an arrangement according to the invention, the filler/mineral loss exiting as mill reject from the vortex cleaning process and/or as reject from the manufacture of filler or coating pigment is reduced by treating the fraction having a concentrated mineral content in the vortex cleaning plant in order to disperse the mineral fraction and to return it to the process.

The method and the apparatus of the present invention provide for example the following advantages:

Filler/mineral, water, chemical, heat and fiber losses as small as possible. Only the useless fraction and the fraction that cannot be processed into a usable form are discharged in a highly concentrated form.

Dispersion of mineral particles is based on internal shear forces of the suspension; in other words mechanical wear is minimal.

Investment costs of the system are very low. The invention is technically carried out with commercial apparatus, repayment period is short.

System is easy to build, i.e. it may also be established in existing systems by collecting mineral-containing rejects from various sources and by adding in the process, for example, subsequent to the last cleaner step or inside the cleaner plant, a screen to fractionate the mineral fraction and the organic fraction, and a cleaner of a new type from which the rejected flow is discharged in a highly concentrated form, and by adding in the process after these stages a treatment stage for dispersing the mineral fraction.

The treatment is preferably carried out in the short circulation of a paper machine for each machine individually; thus for example the water circulations of the machines are not mixed.

The system is a continuously operating part of a short circulation of a paper machine, or of a screening system. In other words, the process conditions are constant and the operation trouble-free.

The process adjusts itself, for example, if the amount of coarse fraction increases, the system returns only the dispersed fraction to the process and the rest is discharged from the system.

The characteristic features of the method and the apparatus of the invention become apparent in the enclosed patent claims.

The method and the apparatus of the present invention are described more in detail below, by way of example, with reference to the accompanying drawings.

DETAILED DESCRIPTION OF THE DRAWINGS

Figure 1A:
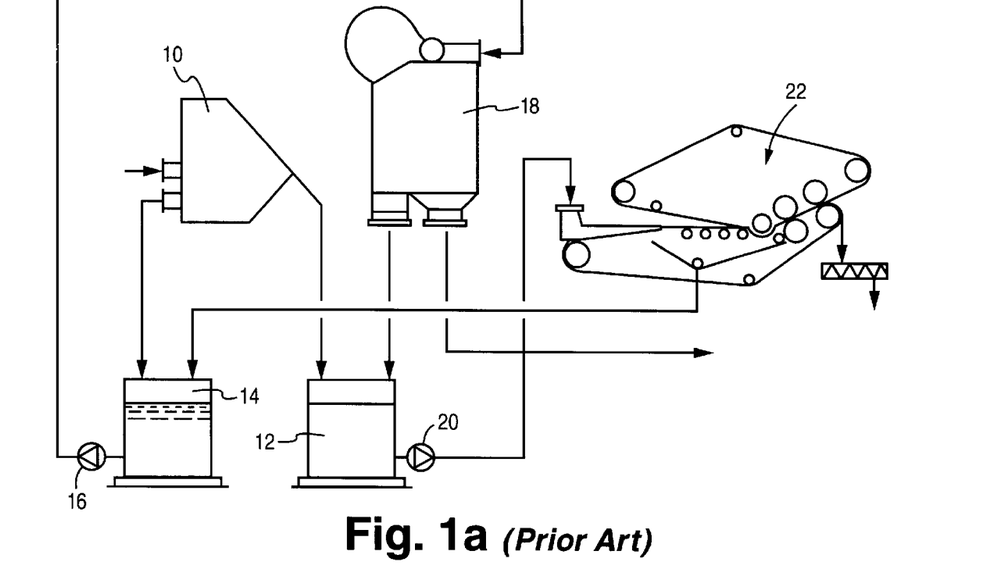
FIGS. 1a and 1b schematically illustrate two prior art filler recovery systems.

An example of a prior art arrangements for diminishing filler/mineral losses is, for example, the arrangement illustrated in FIG. 1a. There the mineral loss is diminished by fractionating fine material having particle size smaller than the slots of the curved screen, i.e. the useful solids, from the discharge flow of the process back to the process. The apparatus operates in such a way that the flow discharged from the process is brought to a curved screen 10, a so-called Hydra-Screen, which divides the flow into two fractions. The coarser fraction is led to an intermediate tank 12 and the finer fraction to a filtrate tank 14. The finer fraction is pumped from the filtrate tank 14 by a pump 16 to a curved screen 18, a so-called Micra-Screen, of the secondary stage, the coarser fraction of which is led to the intermediate tank 12 and the finer fraction, practically speaking all the liquid and the filler flowing with it, is recycled to be reused in the process for example in dilution. The fraction discharged from the intermediate tank 12 as reject of the curved screens 10 and 18 is pumped by a pump 20, for example, to a filter press 22, for thickening the coarse fraction to a more easily treatable consistency. Besides the curved screen 10 illustrated in FIG. 1a, a finely perforated/slotted pressure screen or vortex cleaners (FIG. 1b), such as so-called trap cleaners commonly used in sand separation, may be used as a fractionation apparatus.

Figure 1B:
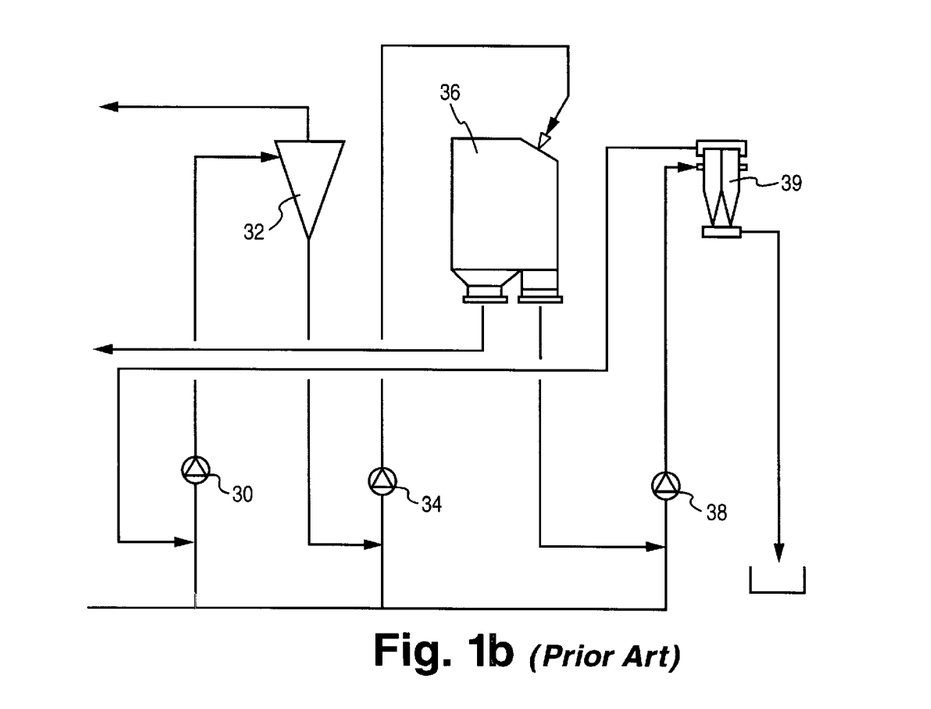

As illustrated in FIG. 1b, the material to be treated is obtained as reject from the third or fourth step of a vortex cleaning plant 32, and this rejected fine fraction is recycled for reuse. The material rejected from the vortex cleaning plant is brought by a pump 34 to a curved screen 36, which preferably is a so-called Micra-Screen, and the liquid accepted by this curved screen, the so-called filtrate, is led to a wire pit or, for example, to be used for dilution in a secondary screening apparatus. The reject of the curved screen 36, in other words the thicker fraction, on the other hand is led to the suction side of a pump 38 and therefrom it is pumped further to a cleaner 39, which preferably is a so-called Eliminator-cleaner, which is disclosed, for example, in U.S. Pat. No. 5,139,652. The accept from the cleaner 39 is led to the suction side of a feed pump 30 of the third or fourth step 32 of the vortex cleaning plant to be pumped for recirculation.

However, it is characteristic of all the above methods that they do not change/diminish the particle size/distribution of the solids to be recovered but only separate the finest and as such at least partly usable fraction and the coarse fraction and return the fine fraction to use.

It is a characteristic feature of a dispersion process of mineral fractions according to the invention that it is based on mechanically generated internal shear forces of the flow/suspension. To have shear forces which have a dispersing effect, i.e., enough efficiency, the concentration of the suspension has to be high. The principle is that the higher the concentration is in which the treatment is carried out the more efficient it is; or, the higher shear forces may be directed to the suspension and the more efficiently the dispersion takes place.

The concentration of the mineral fractions is in a practical way increased by means of a new kind of vortex cleaner construction disclosed in U.S. Pat. No. 5,139,652, said cleaner being extremely efficient in classifying but from which the coarse mineral fraction, having a size of over 10 $\mu$m, is rejected as a highly concentrated flow having a solids content of even more than 40%.

The concentration of the fraction to be treated may be increased also, for example, by filtering or precipitating, but it is characteristic of all these other methods that they require additional apparatus and/or large volumes and time and are very complicated to use as a continuous, trouble-free process. The concentration of the mineral fraction in the new kind of vortex cleaner takes place in connection with the normal operation of the vortex cleaner without any additional apparatus.

After the thickening, i.e. the increase of the solids concentration, the mineral fraction is treated by mechanical mixing elements or grinding apparatus generating great internal shear forces in the suspension. Due to the shear forces the mineral particles rub against each other and are comminuted to such a particle size that they may be used as a filler in paper manufacture.

Figure 2:
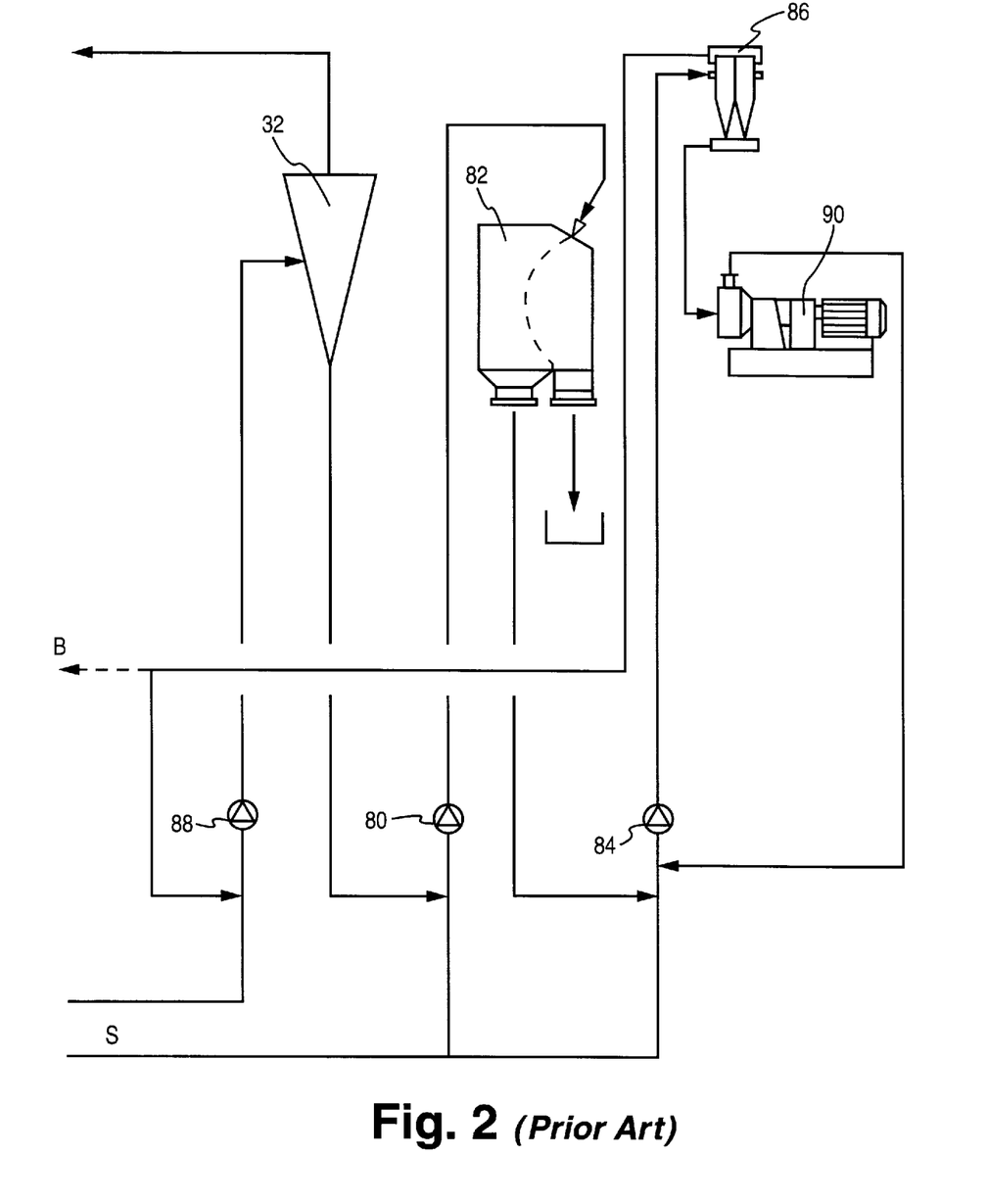
FIG. 2 schematically illustrates an other prior art filler recovery system.

The embodiment illustrated in FIG. 2 is based on the process described in Finnish patent no. 93753. The patent describes a method of treating a filler-containing material such as recycled fiber. According to the method, the recycled fiber material is treated in a multi-step vortex cleaning plant, in the last step of which the material is divided into two fractions the finer of which is returned to use and the coarser fraction, i.e. the reject is forwarded to further processing. It is characteristic of the method of the patent that the reject is supplied to a first fractionation stage, divided into two fractions the finer fraction of which is returned to the vortex cleaning plant and the coarse fraction is taken to a refining stage, it is refined and the refined material is taken to the last fractionating stage in which the comminuted material is divided into two fractions of which the fine fraction is returned to the process. Thus, according to the method, the reject from the vortex cleaning plant is fractionated so that the fine material is returned to the vortex cleaning plant and the coarse fraction is further treated.

Figure 3:
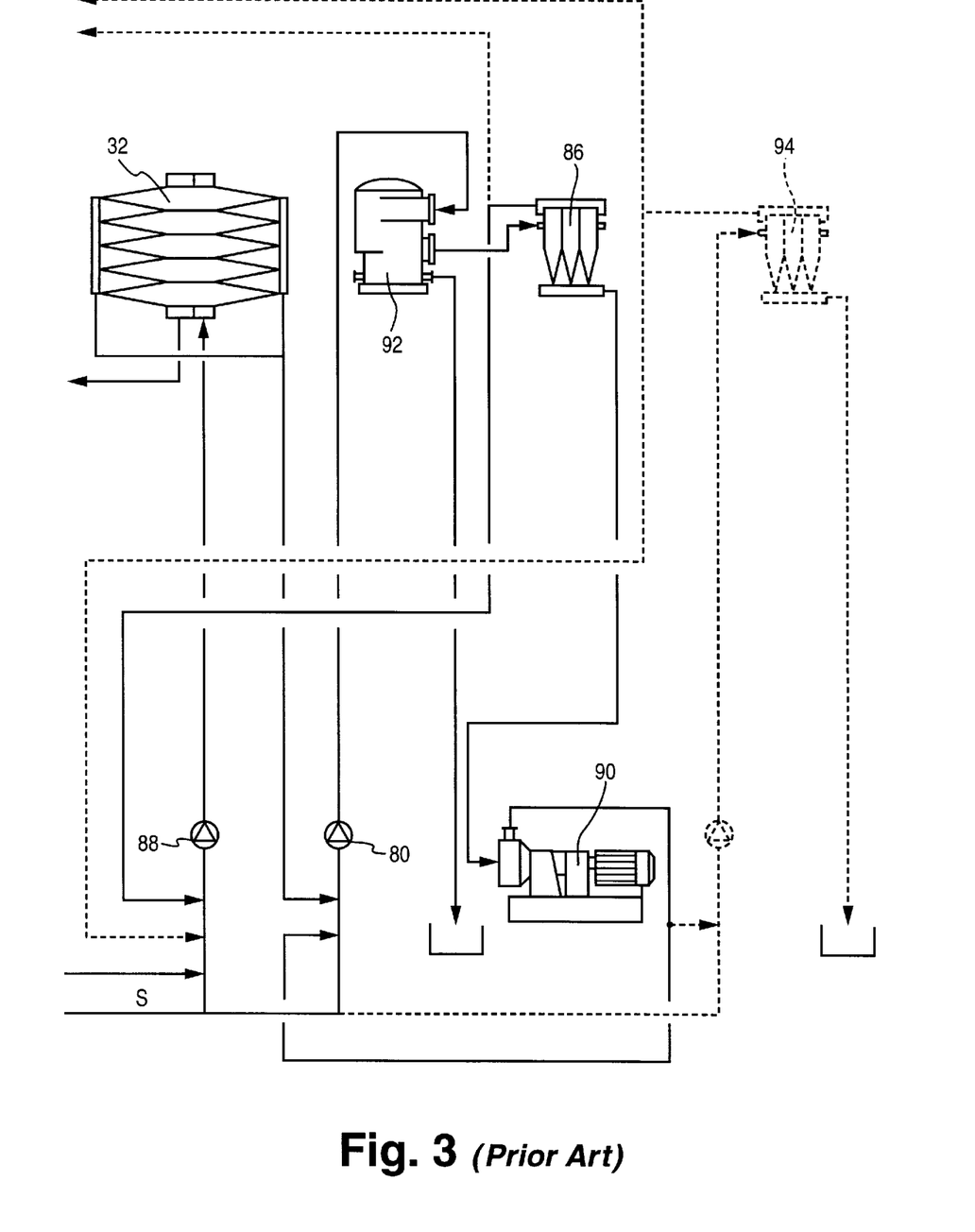
FIG. 3 illustrates yet another prior art filler recovery system.

FIGS. 2 and 3 illustrate an alternative of the method disclosed in the Finnish patent no. 93753 which are also disclosed in WO patent application no. PCT/FI94/00086. In FIG. 2, the coarse reject, which may have an ash content as high as 60–90%, from the last vortex cleaning step 32 is transported by means of a pump 80 and diluted with circulation water preferably containing as little solids as possible, for example with the clear filtrate S from fiber recovery, to the feed of a curved screen 82, for example a so-called Micra-Screen. The screen surface of the curved screen 82 may have a slot size of for example 100–250 $\mu$m. The curved screen divides the feed flow into a thicker fraction and a filtrate. All coarse fractions containing fiber, shives, and impurities are removed in the thicker fraction. Mineral particles that have passed through the slots of the said 100–250 $\mu$m size, and most of the water constitute the filtrate. The filtrate from the curved screen 82 is transported, by means of a pump 84 and diluted preferably with circulation water S containing as little solids as possible, to the feed of vortex cleaners 86. The accept from the vortex cleaners 86 which contains the majority of the water and the fine filler fraction of a size smaller that 10 $\mu$m, is returned for example to the feed of the last vortex cleaner to a pump 88, to the broke system, screening of broke or thickening of broke as illustrated by broken line B. The reject from the vortex cleaner step 86 contains the mineral fraction exceeding the particle size of 10 $\mu$m in a highly concentrated state of approx. 30–50% dry solids content. The reject is guided, for example, by means of free fall to a dispersion apparatus 90 in which the mineral particles in the reject are subjected to strong shear forces. The mineral particles are comminuted and most of the flow leaving the dispersion apparatus 90 has a homogenous particle size and is usable filler fraction of a size less than 10 $\mu$m.

The mineral fraction comminuted in the dispersion apparatus 90 is returned by means of the pump 84 to the feed of the vortex cleaning step 86 operating the in the way described above. Thus, a non-dispersed mineral fraction may be circulated in the dispersion apparatus 90 and the vortex cleaners 86 until the mineral particles have been dispersed to a size suitable for use as filler.

FIG. 3 illustrates an alternative to FIG. 2. The only significant difference when compared to FIG. 2 is that a pressure screen 92 has been used instead of a curved screen, the pressure screen dividing, like the curved screen, the reject from the vortex cleaning process 32 and/or the mineral-containing reject to a coarse fraction to be removed from the process and to a fraction containing mineral particles and to be further treated; the treatment has already been described in connection with FIG. 2. The pressure screen preferably employs a screen drum with a very small perforation (aperture diameter 0.15–0.20 mm). Further, it should be noted that the use of a pressure screen 92 makes the use of the pump 84 illustrated in FIG. 2 unnecessary as the fine fraction obtained from the pressure screen may in a pressurized state be supplied directly to the vortex cleaners 86. Another difference in the embodiment of FIG. 3 as compared with the embodiment of FIG. 2 is that the material dispersed in the dispersion apparatus 90 is returned to the feed of the pressure screen 92 and not directly to the vortex cleaners as in FIG. 2.

Of course, also in the embodiments illustrated in FIGS. 2 and 3, it is possible to arrange several subsequent dividing and dispersing stages, for example, as illustrated in FIG. 4 of the Finnish patent mentioned earlier. Further, it is also possible to convey the dispersed material from the dispersion apparatus 90, for example, to another dividing stage 94 (the entire process part has been illustrated with broken lines because of its optional character), from which the usable fine material is returned to use and the coarse fraction is rejected and discharged from the system.

Figure 4A:
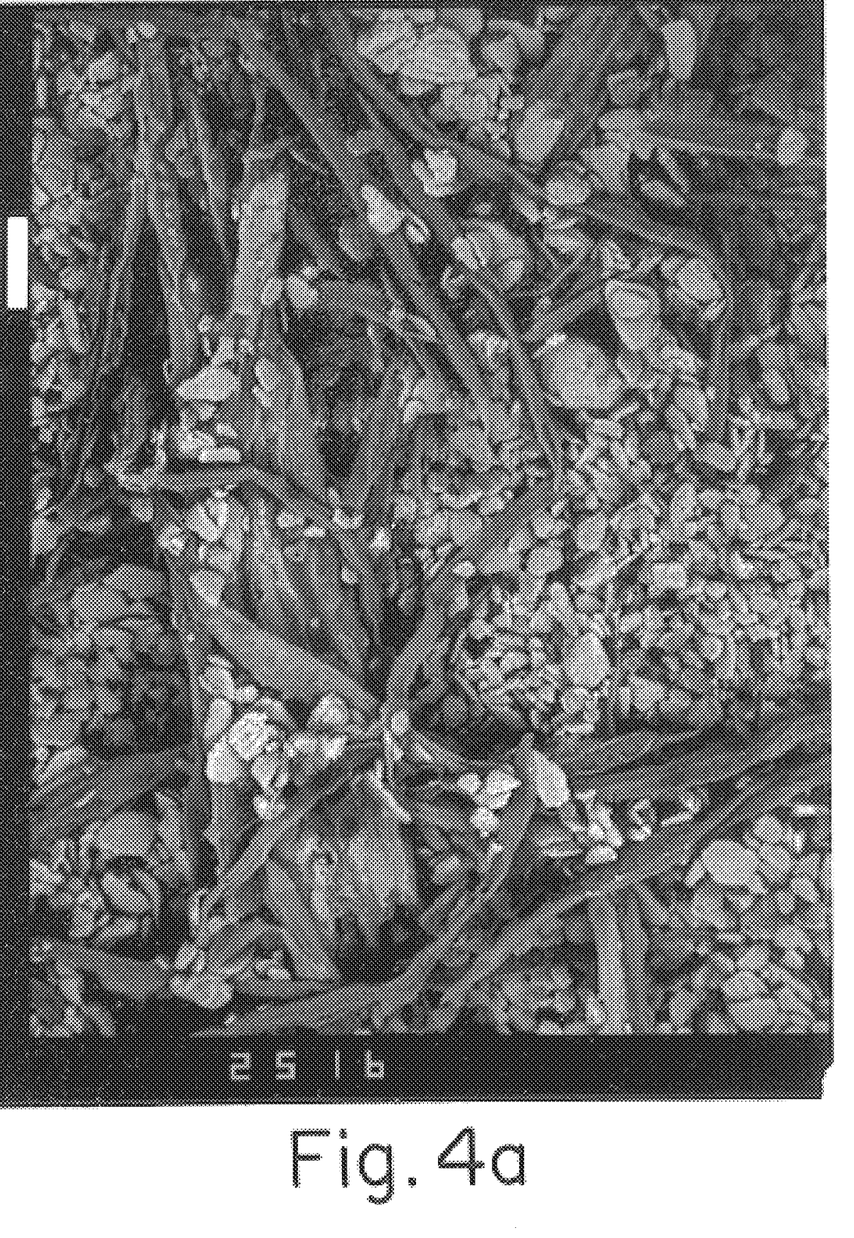
FIGS. 4a–4c illustrate 100 times enlarged photographs of the material fed to the curved screen of the apparatus of FIG. 2 and both fractions obtained from the curved screen.
Figure 4B:
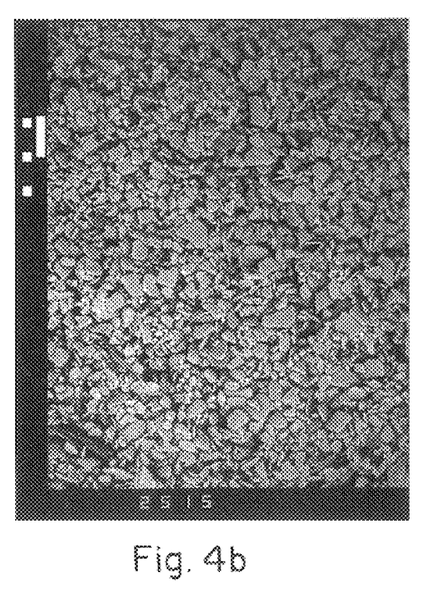
Figure 4C:
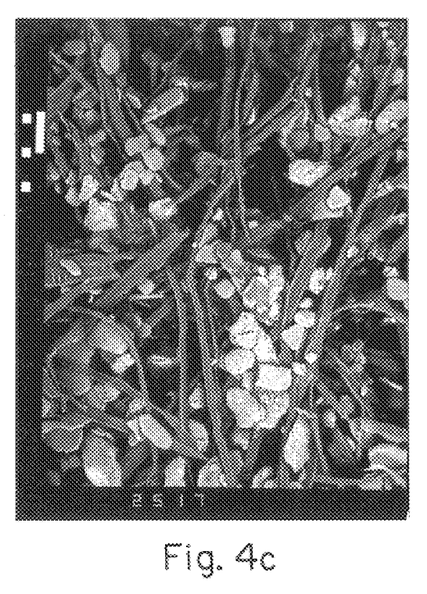

The FIG. series 4a–4c illustrates the feed of the curved screen (FIG. 4a), the filtrate (FIG. 4b) and the reject or the thicker fraction (FIG. 4c) of the process according to FIG. 2. The figures clearly show how all the fiber-containing fraction and the large mineral particles of the feed in FIG. 4a have been rejected to the thicker fraction of FIG. 4c, while the filtrate, FIG. 4b, contains only mineral fraction.

Figure 5:
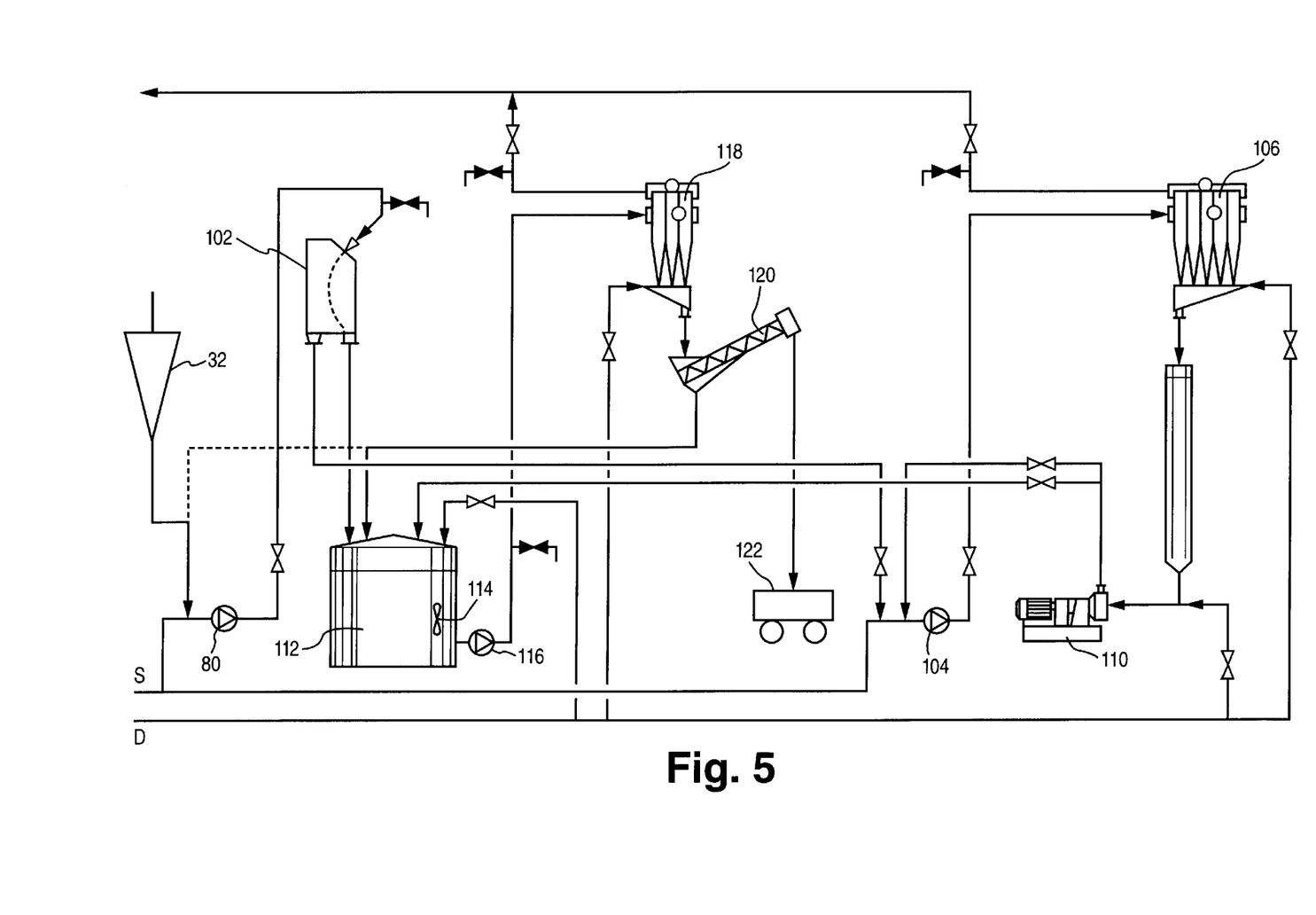
FIG. 5 illustrates a few preferred embodiments of the invention combined in one and the same figure.

FIG. 5 illustrates a version developed further from the process of FIGS. 2 and 3. This version on one hand concentrates on treating the coarse fraction, i.e. the thickened fraction, from the curved screen 82 of FIG. 2 or correspondingly from the pressure screen 92 of FIG. 3. On the other hand, FIG. 5 illustrates a new way of treating and recycling a mineral-containing fraction. In FIG. 5, the coarse reject having an ash content of as high as 60–90%, is transported, by means of pump 80 and diluted for example with the clear filtrate S obtained from fiber recovery and preferably containing as little solids as possible, to the feed of a screen apparatus 102, for example a curved screen, a so-called Micra-Screen (illustrated in the figure), or of a pressure screen, a so-called Ahldecker. When a curved screen is employed the screen surface has slot size of for example 100–250 $\mu$m. When a pressure screen is used, it preferably is a perforated drum having an aperture diameter of approx. 0.15–0.20 mm. The inlet flow of the screen apparatus 102 is divided into a thicker fraction and filtrate. All coarse fractions containing fibers, shives, and other impurities are removed from the thicker fraction. Mineral particles that have been able to pass through the slots of the said 100–250 $\mu$m and most of the water end up in the filtrate. From the screen apparatus 102 the filtrate, which is diluted, preferably with circulation water S containing as little solids as possible, is transported by means of a pump 104 to the inlet flow of vortex cleaners 106. If the screening apparatus 102 is a pressure screen, pump 104 is not necessary. The accept from the vortex cleaners 106 containing the most part of the water and the fine filler fraction of less than 10 $\mu$m is returned for reuse for example via broke treatment or wire pit. The reject from the vortex cleaning step 106 contains the mineral fraction of the size over 10 $\mu$m in a high solids concentration of approx. 30–50%. This reject is taken for example by free fall to a grinding means 110, which may be a dispersion apparatus or a grinder developed specially for this purpose and in which the solid material particles in the reject are subjected to intensive shear forces. The mineral particles are broken down and most of the flow discharged from the grinding means 110 is usable mineral fraction of homogenous particle size of less than 10 $\mu$m.

According to a preferred embodiment of the invention, part of the mineral fraction refined in the grinding means 110 is returned by a pump 104 to the inlet of the vortex cleaning step 106 operating in the way described above. (Another way has been described in connection with FIG. 2 according to which the whole refined fraction is returned to the vortex cleaning step.) Part of the refined mineral fraction is returned with the thickened fraction from the screen apparatus 102 to further treatment. Thus, the non-refined mineral fraction may be recirculated in the grinding means 110 and the vortex cleaners 106 until the mineral particles have broken down to a size usable as a filler.

In previous embodiments, at least in the ones illustrated in FIGS. 2 and 3, the focus has not been on the treatment of the thickened friction obtained from the screen apparatus. In a preferred embodiment of the invention the thickened fraction from the screen apparatus 102 is taken to an intermediate tank 112 into which also dilution liquid D is supplied; the liquid may be for example clear filtrate from fiber recovery. The thickened fraction from the screen apparatus 102 is diluted in the intermediate tank 112 provided with a mixer 114 to ensure homogenous consistency. The diluted fraction is forwarded by a pump 116 to vortex cleaners 118 which separate the usable fiber and the fine filler fraction which are recycled to use via, for example, the broke treatment system. The reject from the vortex cleaners 118 which contains among other things large fiber lumps, impurities and mineral pieces, is taken according to a preferred embodiment of the invention to a screw thickener 120 which increases the consistency of the reject as high as possible, and thus the reject at the discharge consistency of the screw thickener 120 may be transported directly for instance to combustion. If desired, for avoiding liquid effluent, the filtrate from the screw thickener 120 is returned, for example, to the intermediate tank 112; thereby also the fines contained in the filtrate are recovered. Another alternative (indicated in FIG. 5 by a broken line) is to return the filtrate from the screw thickener to the inlet flow of pump 80 whereby the mineral particles in the filtrate may be accepted at the curved screen 102 and be transported further to dispersion.

As already stated above, part of the material refined by the grinding means 110 may be returned with the reject from the screen apparatus 102 for further treatment. This is most practically done by guiding the fines fraction to the intermediate tank 112 and mixing it there with the reject from the screen apparatus 102 whereby the fine fraction which has been adequately refined is accepted in the vortex cleaners 118 and is returned that way to use.

Figure 6:
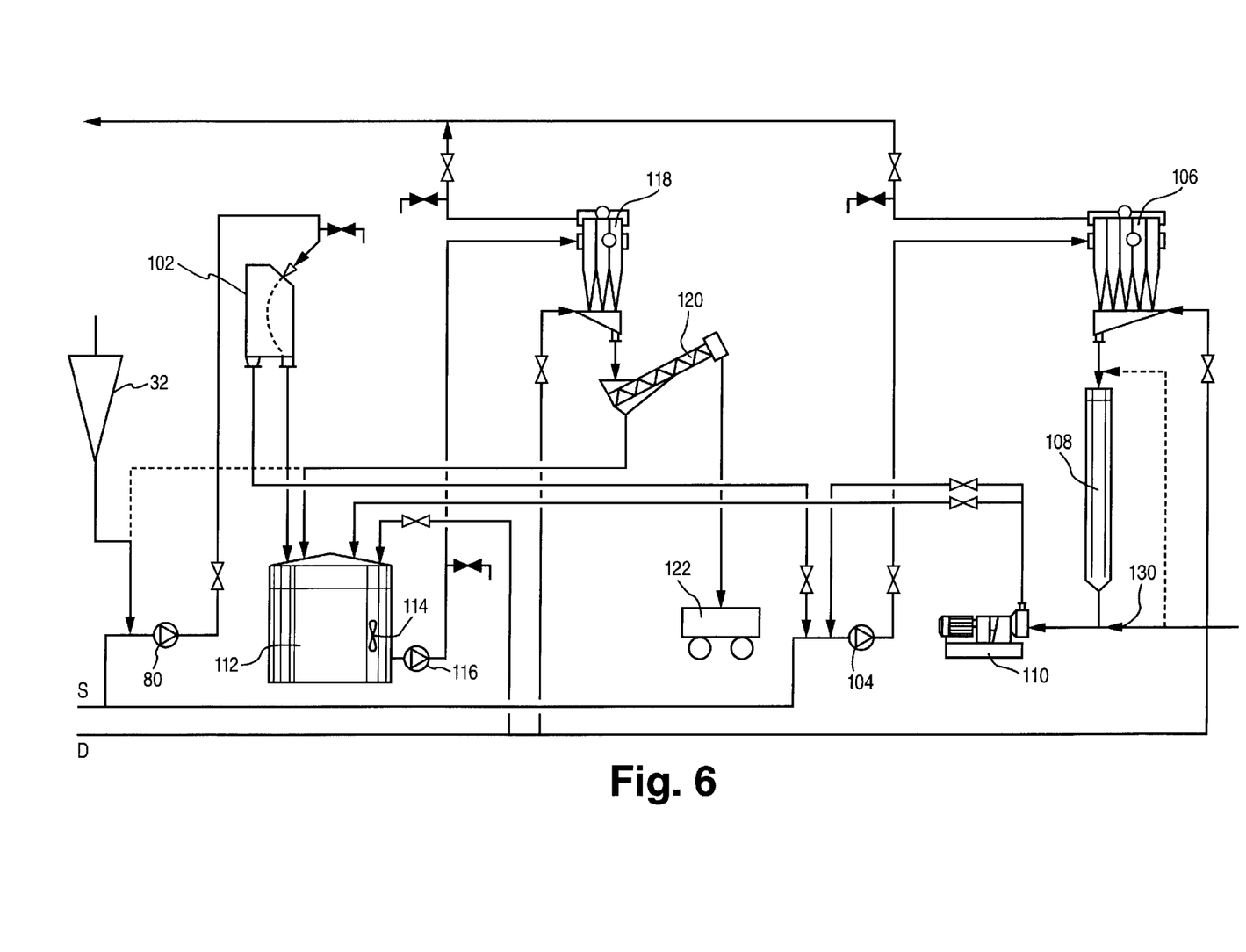
FIG. 6 illustrates another preferred embodiment of the invention.

FIG. 6 illustrates yet another preferred embodiment of the invention combined with the process illustrated in FIG. 5, although the partial process described in the embodiment does not presuppose employing all the other partial processes of FIG. 6. This embodiment is based on the idea which we have found out in tests we have performed that dispersion may be intensified both by treating the fraction to be dispersed with chemicals and by heating it. Naturally it is possible to treat the fraction at the same time both with chemicals and by heating and either prior to or during the dispersion. The heating is preferably done with steam. In the embodiment of FIG. 6, chemicals and/or steam is added to the fraction obtained as reject from the vortex cleaner 106 for example by injecting at 130 prior to the dispersion apparatus or prior to a vertical pipe 108.

When heating the fraction to be dispersed, attention should be paid to the fact that the fraction may contain stickies, glues, binding agents, plastics-based substances, etc. which should not be allowed to soften so much that they stick to the process piping or process equipment. Also, one should be very careful when using the chemicals employed to soften the mineral fraction, the so-called latex softeners; they must not promote adhering of the stickies.

This embodiment provides among other things the advantage that it improves efficiency because the dispersion is directed only to the fraction requiring dispersion.

Figure 7:
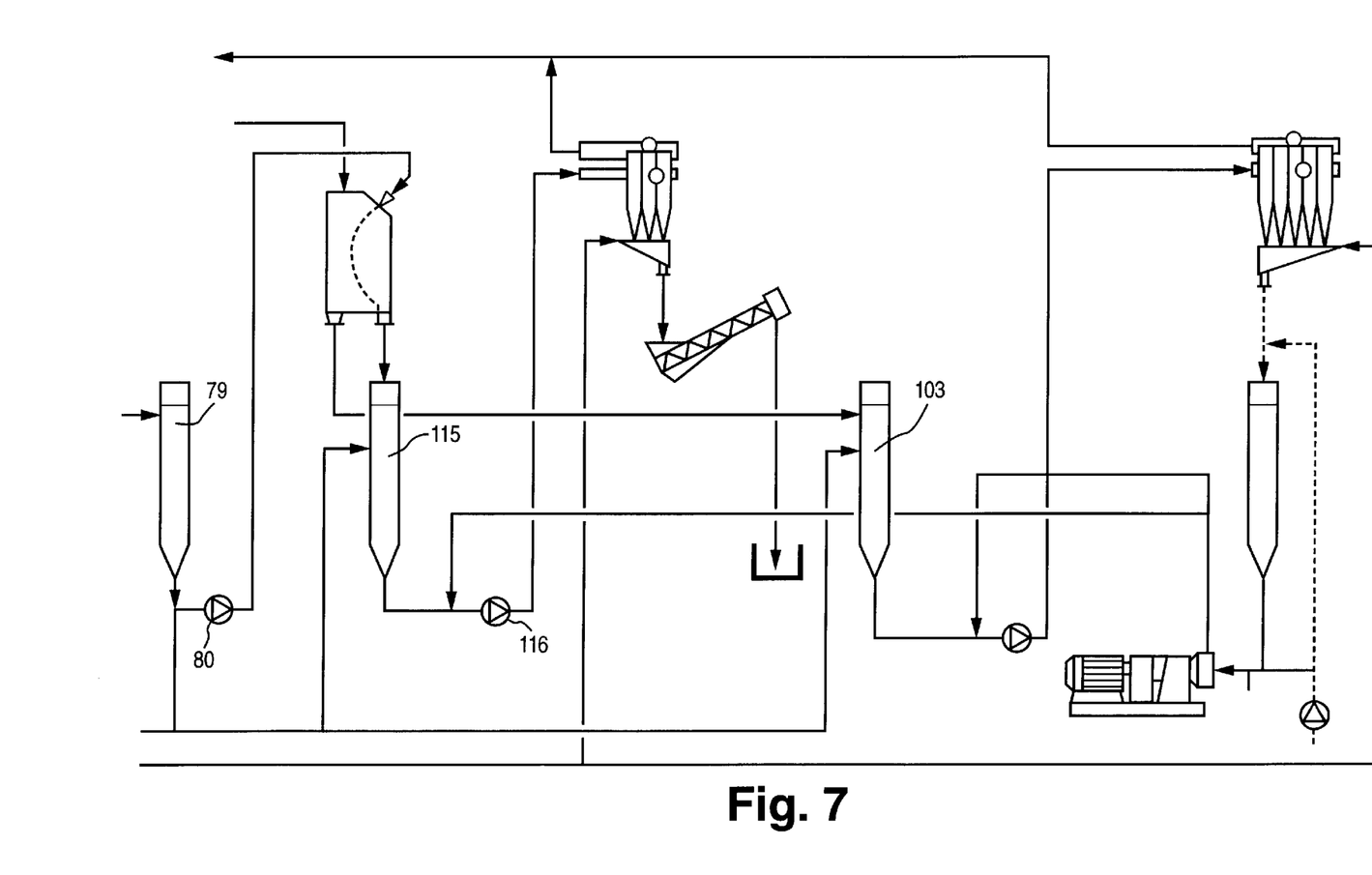
FIG. 7 illustrates yet another preferred embodiment of the invention.

FIG. 7 illustrates yet another preferred embodiment of the invention. In fact, the process is of the same types as illustrated in FIG. 6, employing an intermediate tank 79, 115 and 103 prior to a pump 80, 116 and 104'. The intermediate tanks may be of the same type as the intermediate tank 112 illustrated in FIG. 6, i.e. tanks provided with a mixer to ensure that the mineral fraction is not sedimented on the bottom of the tank and to ensure that the mineral concentration of the liquid to be pumped further is practically stable. The tanks 79, 115 and 103 may be of the same type, also, as the tank 18 in FIG. 6, i.e. having a fairly small diameter and preferably such a form that the mineral fraction cannot easily concentrate. Further, the supply of dilution liquid to the intermediate tanks 79, 115, and 103 has preferably been arranged so that the flow of the dilution liquid causes the content of the intermediate tank to rotate, which prevents the mineral particles from settling. The mixing, itself, of the liquid and the mineral particles to form a homogenous suspension takes place in the pumps following the intermediate tanks.

As can be understood from the many embodiments of the invention described above which to some extent differ from each other, a new method and apparatus previously not known has been developed for treating recycled fiber material so that as much as possible of the minerals and usable fiber therein can be recovered fore reuse. Firstly, it must be noted that all the apparatus described and illustrated in the Figs. have been connected to each other via flow paths suitable for that purpose and either illustrated in the figures, described in the description or mentioned in the claims. It must also be noted that the screening and fractionating devices mentioned above, i.e. vortex cleaners, pressure screens, and curved screens are interchangeable where appropriate and that they may be replaced by other devices performing the same task. In other words, in the embodiments of the present invention described above, the treatment the devices carry out is critical, not the type of the device. Further, it should be noted that the embodiments presented above are examples, only, of the many variations of the invention and they do not by any means intent to limit the invention to the embodiments described. It should also be understood that although a vortex cleaning plant has been discussed above, the reject of which is treated with the process of the present invention, the type of the cleaning plant is not important in view of the invention but the reject of the plant. This means that it does not matter how the wood-based fiber material and mineral particles have been separated to a separate fractions, they may in any case be further treated by the process of the invention. Thus, it is clear that although a grinder or a mill type refiner has been described above as the mixing/grinding device, also a tank provided with one or several mixing/refining rotors may be used as the refining apparatus. It is also clear that the various details described in connection with different embodiments may be employed also in other embodiments where applicable, although that has not been specifically mentioned. Further, it should be remembered that the use of steam and/or chemicals prior to dispersion, described in the embodiment of FIG. 6, may alone be employed in all possible dispersion applications without the other partial processes illustrated in FIG. 6. Thus, the invention is defined by the appended patent claims, only.

I claim:

1. Apparatus for treating mineral containing recycled fibers from a paper mill, comprising:

a vortex cleaning plant for separating recycled fibers into an accept fraction and a reject fraction;

means for fractionating rejects associated with the vortex cleaning plant, and other mineral-containing rejects from the paper mill, in a first fractionating stage to produce a second accept fraction and a second reject fraction;

mixing and dispersing means for treating said second accepts fraction; and means for treating said second reject fraction to recover fillers therefrom, including a screening stage to divide the second reject fraction into a filler fraction which is reused, and a coarse mineral fraction.

2. Apparatus as recited in claim 1 wherein said first fractionating stage comprises screening means.

3. Apparatus as recited in claim 2 wherein said screening means comprises at least one cyclone separator.

4. Apparatus as recited in claim 2 further comprising a screw thickener for thickening said second rejects from said screening means.

5. Apparatus as recited in claim 1 further comprising a screw thickener for thickening said second rejects from said first fractionating stage.

6. Apparatus as recited in claim 1 wherein said first fractionating stage comprises a pressure screen.

7. Apparatus as recited in claim 1 wherein said screening stage comprises at least one cyclone separator.

8. Apparatus as recited in claim 1 wherein said screening stage comprises a pressure screen.

9. A method of treating at least recycled fibers including minerals from a paper making process, comprising:

(a) vortex cleaning the recycled fibers to divide them into a first, finer, fraction and a second, coarser, fraction;

(b) using the first, finer, fraction in the paper making process;

(c) treating the second, coarser, fraction in a first dividing stage by dividing it into third and fourth fractions, the third fraction primarily comprising shives and like wood-based materials and impurities, and the fourth fraction comprising primarily minerals;

(d) treating the third fraction to recover useful fiber material therefrom; and (e) further treating the fourth, primarily mineral, fraction to produce usable minerals, and returning the usable minerals to the paper making process.

10. A method as recited in claim 9 wherein (e) is practiced in a second screening stage which divides the fourth fraction into a reusable filler fraction, and a coarse mineral fraction.

11. A method as recited in claim 10 further comprising dispersing the coarse mineral fraction, and returning at least a portion of the dispersed coarse mineral fraction to the second screening stage.

12. A method as recited in claim 11 further comprising further treating at least a portion of the dispersed coarse mineral fraction.

13. A method as recited in claim 12 wherein further treating of the dispersed coarse mineral fraction from (c), and the third fraction in (d), are practiced by dilution and then screening.

14. A method as recited in claim 9 wherein (e) is practiced by dispersing and diluting the fourth fraction, and effecting at least one of heating and treating with chemicals of the fourth fraction while it is diluted so as to produce a usable mineral fraction.

15. A method as recited in claim 14 wherein (e) is further practiced by adding at least one of steam and chemicals to the fourth fraction prior to dispersion.

16. A method as recited in claim 9 wherein (c) is also practiced using other mineral-containing rejects from the paper making process.

17. A method as recited in claim 9 wherein (d) is practiced in a screening stage, from where usable fiber material is returned back to the process.

18. A method as recited in claim 17 comprising the further step of diluting the third fraction before said screening stage.

19. A method of treating at least recycled fibers including minerals from a paper making process, comprising:

(a) vortex cleaning the recycled fibers to divide them into a first, finer, fraction and a second, coarser, fraction;

(b) using the first, finer, fraction in the paper making process;

(c) treating the second, coarser, fraction in a first dividing stage by dividing it into third and fourth fractions, the third fraction primarily comprising shives and like wood-based materials and impurities, and the fourth fraction comprising primarily minerals; and (d) further treating the fourth, primarily mineral, fraction to produce usable minerals, and returning the usable minerals to the paper making process by dispersing and diluting the fourth fraction, and effecting at least one of heating and treating with chemicals of the fourth fraction while it is diluted so as to produce a usable mineral fraction.

20. A method as recited in claim 19 wherein (d) is further practiced by adding at least one of steam and chemicals to the fourth fraction prior to dispersion.

* * * * *